(12) United States Patent
Janakiraman et al.

(10) Patent No.: US 11,798,755 B2
(45) Date of Patent: Oct. 24, 2023

(54) REAL TIME MONITORING AND PARAMETRIC MODIFICATIONS FOR ELECTRONIC CIRCUIT BREAKERS THROUGH A REMOTE DEVICE

(71) Applicant: Siemens Industry, Inc., Alpharetta, GA (US)

(72) Inventors: Arthi Sudhakar Janakiraman, Cumming, GA (US); Matthew Leidy, Norcross, GA (US); Westin Williams, Marietta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 80 days.

(21) Appl. No.: 17/374,451

(22) Filed: Jul. 13, 2021

(65) Prior Publication Data
US 2023/0012859 A1   Jan. 19, 2023

(51) Int. Cl.
| | | |
|---|---|---|
| H01H 9/16 | (2006.01) | |
| G08C 17/02 | (2006.01) | |
| H01H 71/04 | (2006.01) | |

(52) U.S. Cl.
CPC .............. *H01H 9/167* (2013.01); *G08C 17/02* (2013.01); *H01H 71/04* (2013.01); *H01H 9/168* (2013.01)

(58) Field of Classification Search
CPC ........ H01H 9/167; H01H 71/04; H01H 9/168; G08C 17/02
See application file for complete search history.

(56) References Cited

U.S. PATENT DOCUMENTS

| | | | |
|---|---|---|---|
| 2004/0204075 A1 | 10/2004 | Rusnak et al. | |
| 2009/0206059 A1 | 8/2009 | Kiko | |
| 2009/0248329 A1* | 10/2009 | Restrepo | G01R 31/1272 324/509 |
| 2013/0021163 A1* | 1/2013 | Watford | H02M 3/046 340/638 |
| 2013/0329331 A1 | 12/2013 | Erger et al. | |
| 2014/0170971 A1 | 6/2014 | Walsh et al. | |
| 2015/0168487 A1* | 6/2015 | Parker | H02H 1/0061 702/58 |
| 2017/0059618 A1* | 3/2017 | Lee | G01R 13/0254 |
| 2020/0051423 A1* | 2/2020 | Kevelos | G01R 31/3277 |
| 2021/0278453 A1* | 9/2021 | Denney | G01R 31/1227 |
| 2022/0091187 A1* | 3/2022 | Kuhn | G01R 31/3274 |
| 2022/0301803 A1* | 9/2022 | Alruwaili | H01H 89/08 |

* cited by examiner

*Primary Examiner* — Omer S Khan

(57) ABSTRACT

An electronic circuit breaker provides waveform data wirelessly and alters a breaker code wirelessly. The breaker comprises a transceiver to wirelessly transmit information including waveform data, a microcontroller including a processor and a memory and computer-readable firmware code stored in the memory which, when executed by the processor, causes the microcontroller to: monitor in real-time breaker functional parameters to determine parametric modifications, wirelessly transmit the information that was saved previously in the electronic circuit breaker about the one or more breaker functional parameters to a remote device with a graphical user interface, alter a breaker algorithm after analyzing load data of problematic electrical loads in a mobile application (APP) of the remote device to treat the problematic electrical loads as normal and safe and test the computer-readable firmware code with a problematic electrical load to make sure the electronic circuit breaker doesn't still trip on the problematic electrical load.

20 Claims, 14 Drawing Sheets

FIG. 5

505 — Offline Records / 3/90 records

510 → BathroomLights 01:23 PM 01/19/2021

Trigger Source
Load Current Signal

Trigger Direction
Rising

Trigger Window
20 cycles after trigger

Buffer Size
20

Trigger Level
425

512 — 507 Show

KitchenLightsTrip 01:22 PM 01/19/2021

ArcingEvent 1 01:08 PM 01/19/2021

FIG. 4

405 — Offline Records / 3/90 records

BathroomLights 01:23 PM 01/19/2021

KitchenLightsTrip 01:22 PM 01/19/2021

ArcingEvent 1 01:08 PM 01/19/2021

Delete All

FIG. 16

Record | History — 1605

New Record

3/90 records

BathroomLights 01:23 PM 01/19/2021 — 1620 ⊳ 1615

KitchenLightsTrip 01:22 PM 01/19/2021 ⊳

ArcingEvent 1 01:08 PM 01/19/2021 ⊳

Delete All — 1610

1607

Dashboard  Status  Record  Settings

FIG. 15

Record | History

New Record

Enter File Name — 1505
Alpha numeric characters, . , _ , - and # are supported

ArcingEvent 1

CANCEL    SAVE — 1507

REAL TIME MONITORING AND PARAMETRIC MODIFICATIONS FOR ELECTRONIC CIRCUIT BREAKERS THROUGH A REMOTE DEVICE

BACKGROUND

1. Field

Aspects of the present invention generally relate to real time monitoring and parametric modifications for electronic circuit breakers through a remote device with a graphical interface.

2. Description of the Related Art

Currently, there is no easy way to understand why a residential circuit breaker trips on electrical loads that seem completely safe and normal. Also troubleshooting problems associated with these unwanted trips are time consuming and expensive to the business.

The present way to get insight into the unwanted tripping problem is to hook up oscilloscopes to an electronic circuit breaker while in the panel to retrieve more information. Alternately, the circuit breaker is brought back to a R&D lab facility to retrieve information that was saved previously in the circuit breaker. After analyzing the load data in the R&D lab, one has to alter a breaker algorithm to treat these unusual loads as normal and safe. After this, new firmware code of the circuit breaker would have to get tested with a problematic electrical load to make sure the circuit breaker doesn't still trip on it.

Therefore, there is a need for a better electronic circuit breaker for a residential application.

SUMMARY

Briefly described, aspects of the present invention relate to an electronic circuit breaker for a residential application. Real time monitoring and parametric modifications for electronic circuit breakers through a remote device with a graphical interface is provided. The invention lets a user retrieve information from an electronic circuit breaker installed in the panel wirelessly to a mobile phone application (APP). The APP can show live current, voltage and RF signal data which are used in a breaker algorithm to trip in case of an unsafe and arcing electrical load. The APP working in tandem with the electronic circuit breaker can act like an oscilloscope where the user can set certain trigger conditions and the APP would show captured results. The APP can also share the retrieved data by means of email or messaging Apps outside of the mobile phone. The R&D experts can now look at the waveforms of the problematic electrical load very quick and recommend fixes in the breaker algorithm. The APP can also allow the user to tweak some of the breaker thresholds to alter the breaker algorithm. Alternately, if there is a code update that is necessary to fix the issue then a new firmware code can be programmed into the electronic circuit breaker wirelessly through the APP. The electronic circuit breaker can then be tested with the problematic electrical load to make sure the new firmware code has helped fix the unwanted tripping problem. This invention speeds up troubleshooting time significantly and saves on costs involved in making expensive field visits from R&D staff or shipping expensive equipment around the country for troubleshooting visits. The new breaker algorithm also can store previous trip events with a time stamp. This information can be retrieved on power up to find how many days power has been down on that breaker.

In accordance with one illustrative embodiment of the present invention, an electronic circuit breaker comprises a transceiver to wirelessly transmit information including waveform data and a microcontroller including a processor and a memory. The breaker further comprises computer-readable firmware code stored in the memory which, when executed by the processor, causes the microcontroller to: monitor in real-time one or more breaker functional parameters to determine parametric modifications, wirelessly transmit the information that was saved previously in the electronic circuit breaker about the one or more breaker functional parameters to a remote device with a graphical user interface, alter a breaker algorithm after analyzing load data of problematic electrical loads in a mobile application (APP) of the remote device to treat the problematic electrical loads as normal and safe and test the computer-readable firmware code with a problematic electrical load to make sure the electronic circuit breaker doesn't still trip on the problematic electrical load.

In accordance with one illustrative embodiment of the present invention, a method of retrieving waveform data from an electronic circuit breaker wirelessly and altering a breaker code wirelessly is provided. The method comprises providing a transceiver to wirelessly transmit information including waveform data, providing a microcontroller including a processor and a memory, providing computer-readable firmware code stored in the memory which, when executed by the processor, causes the microcontroller to: monitor in real-time one or more breaker functional parameters to determine parametric modifications, wirelessly transmit the information that was saved previously in the electronic circuit breaker about the one or more breaker functional parameters to a remote device with a graphical user interface, alter a breaker algorithm after analyzing load data of problematic electrical loads in a mobile application (APP) of the remote device to treat the problematic electrical loads as normal and safe and test the computer-readable firmware code with a problematic electrical load to make sure the electronic circuit breaker doesn't still trip on the problematic electrical load.

BRIEF DESCRIPTION OF THE DRAWINGS

FIG. 4 illustrates a schematic of offline records stored in the mobile phone in accordance with an exemplary embodiment of the present invention.

FIG. 5 illustrates a schematic of browsing through offline records in accordance with an exemplary embodiment of the present invention.

FIG. 15 illustrates a schematic of saving waveform data in accordance with an exemplary embodiment of the present invention.

FIG. 16 illustrates a schematic of viewing list of saved records in accordance with an exemplary embodiment of the present invention.

FIG. 19 illustrates a schematic of editing variables in accordance with an exemplary embodiment of the present invention.

FIG. 20 illustrates a schematic of editing threshold settings for alerts in accordance with an exemplary embodiment of the present invention.

DETAILED DESCRIPTION

Figure 1:
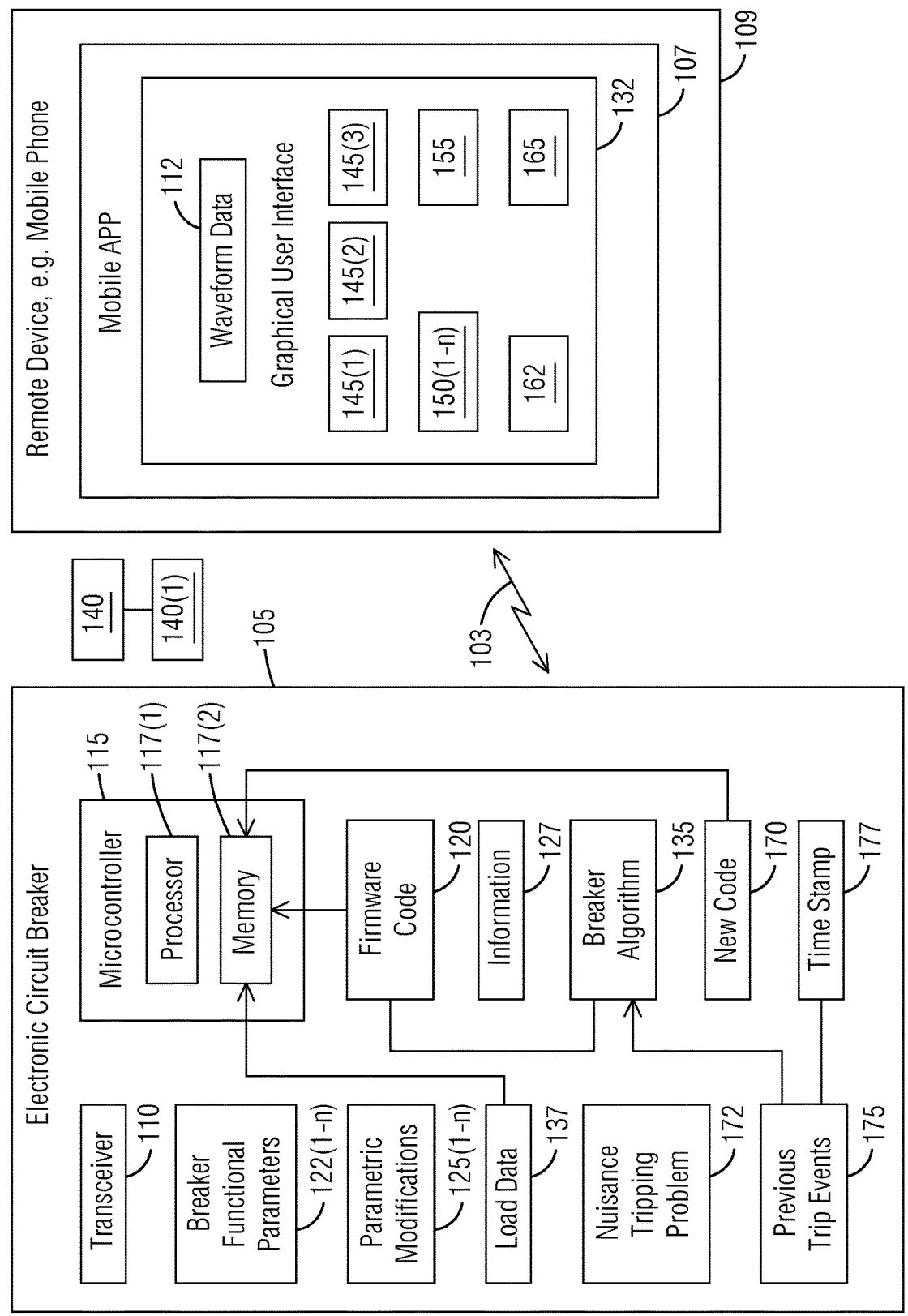
FIG. 1 illustrates a schematic of a block diagram of an electronic circuit breaker that wirelessly communicates with a mobile phone application (APP) for diagnostics purposes in accordance with an exemplary embodiment of the present invention.

To facilitate an understanding of embodiments, principles, and features of the present invention, they are explained hereinafter with reference to implementation in illustrative embodiments. In particular, they are described in the context of real time monitoring and parametric modifications for electronic circuit breakers through a remote device with a graphical interface. The invention provides ability to retrieve waveform data from a breaker wirelessly or have ability to alter the breaker code wirelessly. The invention here reduces troubleshooting time and costs significantly by incorporating an oscilloscope feature within an electronic circuit breaker itself and adding the feature to wirelessly retrieve information from a mobile phone. The ability to update code on the electronic circuit breaker wirelessly speeds up time in verifying new code against the problematic electrical load. Also, giving the user information on how long the electronic circuit breaker was down is useful information. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the electronic circuit breaker according to the present disclosure are described below with reference to FIGS. 1-21 herein. Like reference numerals used in the drawings identify similar or identical elements throughout the several views. The drawings are not necessarily drawn to scale.

Consistent with one embodiment of the present invention, FIG. 1 represents a block diagram of an electronic circuit breaker 105 that wirelessly communicates with a mobile application (APP) 107 for diagnostics purposes via a wireless link 103 in accordance with an exemplary embodiment of the present invention. The present invention generally relates to real time monitoring and parametric modifications for the electronic circuit breaker 105 through a remote device (e.g., a mobile phone) 109 with a graphical user interface 132. The electronic circuit breaker 105 comprises a transceiver 110 to wirelessly transmit information including waveform data 112. The electronic circuit breaker 105 further comprises a microcontroller 115 including a processor 117(1) and a memory 117(2). The electronic circuit breaker 105 further comprises computer-readable firmware code 120 stored in the memory 117(2) which, when executed by the processor 117(1), causes the microcontroller 115 to monitor in real-time one or more breaker functional parameters 122(1-$n$) to determine parametric modifications 125(1-$n$), wirelessly transmit information 127 that was saved previously in the electronic circuit breaker 105 about the one or more breaker functional parameters 122(1-$n$) to the remote device 109 with the graphical user interface 132, alter a breaker algorithm 135 after analyzing load data 137 of problematic electrical loads 140 in the mobile application (APP) 107 of the remote device 109 to treat the problematic electrical loads 140 as normal and safe and test the computer-readable firmware code 120 with a problematic electrical load 140(1) to make sure the electronic circuit breaker 105 doesn't still trip on the problematic electrical load 140(1).

The computer-readable firmware code 120 lets the mobile application (APP) 107 wirelessly retrieve the information 127 from the electronic circuit breaker 105 installed in a panel. The mobile application (APP) 107 is configured to show live current 145(1), voltage 145(2) and Radio Frequency (RF) signal data (145(3) which are used in the breaker algorithm 135 to trip in case of an unsafe and arcing electrical load such as the problematic electrical load 140(1). The mobile application (APP) 107 is configured to work in tandem with the electronic circuit breaker 105 so it can act like an oscilloscope where a user can set certain trigger conditions 150(1-$n$) and the mobile application (APP) 107 will show captured results 152. The mobile application (APP) is configured to share any retrieved data 155 by means of email or messaging Apps outside of a mobile phone 109 on which the mobile application (APP) 107 is installed.

In the mobile application (APP) 107, waveforms 162 of the problematic electrical load 140(1) can be examined and fixes 165 in the breaker algorithm 135 recommended. The mobile application (APP) 107 enables a user to tweak one or more of breaker thresholds 167(1-$m$) to alter the breaker algorithm 135.

If there is a code update that is necessary to fix an issue, a new code 170 can be programmed into the electronic circuit breaker 105 wirelessly through the mobile application (APP) 107. The electronic circuit breaker 105 can then be tested with the problematic electrical load 140(1) to ensure the new code 170 has helped fix a unwanted tripping problem 172. The breaker algorithm 135 is configured to store previous trip events 175 with a time stamp 177.

For example, Arc Fault Circuit Interrupter (AFCI) Diagnostics is a mobile App that is available both in Android and iOS platforms to communicate with the breakers to perform diagnostic troubleshooting. A mobile phone communicates with a breaker over Bluetooth Low Energy 5.0 protocol. The mobile App can be downloaded and installed using information from the manual document. Once the mobile App is installed, a user can follow a manual document to set up the breaker for troubleshooting and collecting data. The manual document identifies the features present in the mobile App. Also, the manual document assumes the communicating breaker is running a certain firmware version. Click on the mobile App icon from the mobile phone to see a splash screen followed by a screen showing the list of available breaker devices in the vicinity.

Figure 2:
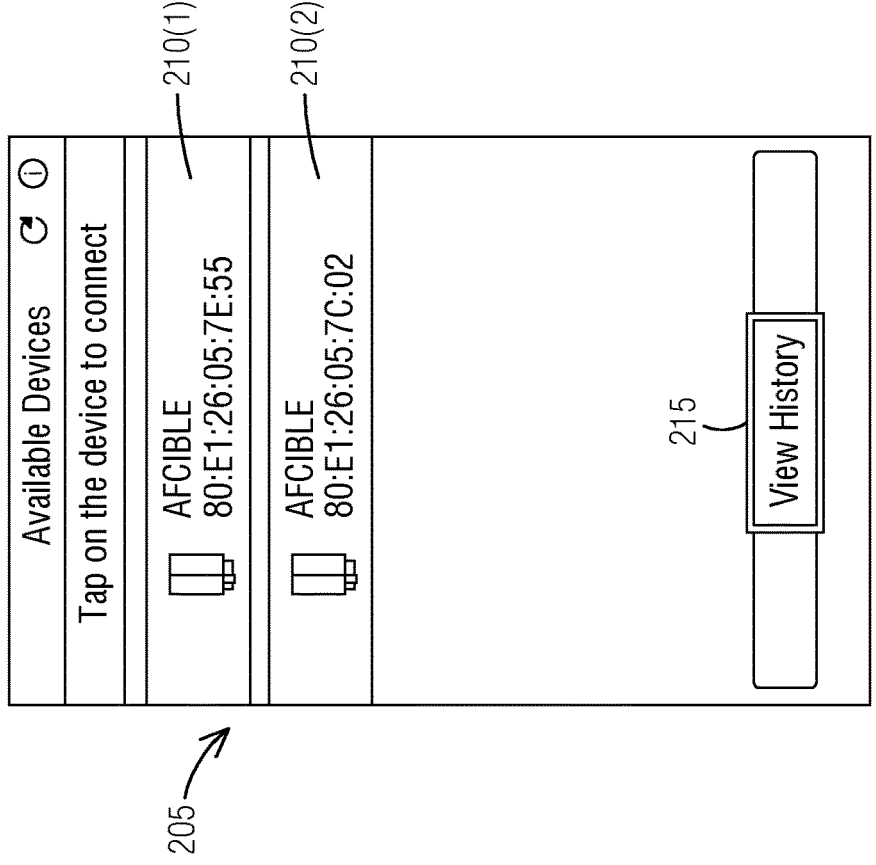
FIG. 2 illustrates a schematic of a user interface of a mobile phone application (APP) that shows available devices showing breakers in the vicinity in accordance with an exemplary embodiment of the present invention.

Referring to FIG. 2, it illustrates a schematic of a user interface 205 of a mobile phone application (APP) that shows available devices 210(1-2) showing breakers in the vicinity in accordance with an exemplary embodiment of the present invention. The available devices screen is the first screen that a user will view after the mobile App is loaded. It will display any wireless breaker ("AFCIBLE") that is within range. Available Devices screen also has a view history button 215 that allows the user to view any previously saved records.

Figure 3:
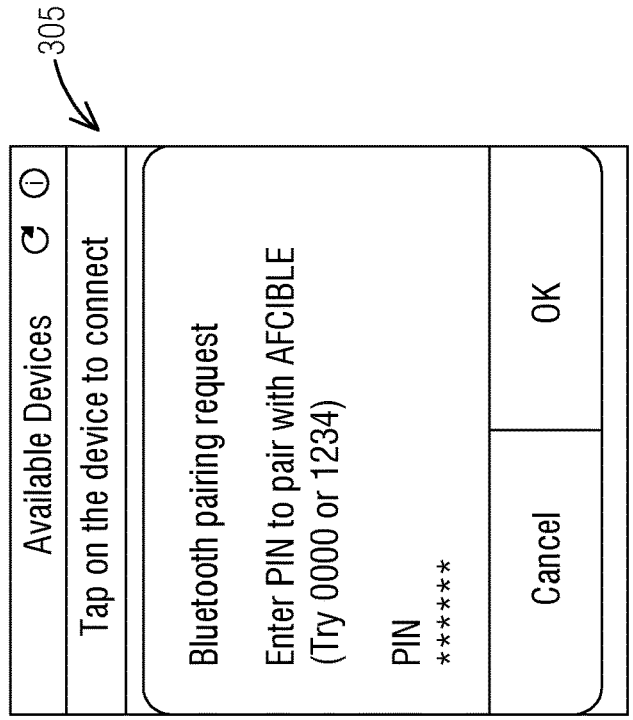
FIG. 3 illustrates a schematic of a display screen of a mobile phone application (APP) that shows pairing of a mobile phone with an electronic circuit breaker in accordance with an exemplary embodiment of the present invention.

Turning now to FIG. 3, it illustrates a schematic of a display screen 305 of a mobile phone application (APP) that shows pairing of a mobile phone with an electronic circuit breaker in accordance with an exemplary embodiment of the present invention. To connect to a breaker, the user can click on the device of interest from the displayed list. If this is the first time that the user is connecting their phone to a given breaker, they will have to enter the multi-digit passcode to pair the phone to the breaker. Once the pairing process is complete, the user will be navigated to the Dashboard section of the mobile App, showing the breaker details. The user can also view additional information about the app from this page by clicking the "i" icon.

FIG. 4 illustrates a schematic of offline records 405 stored in the mobile phone in accordance with an exemplary embodiment of the present invention. When on the available devices screen the user has the option to view, share and delete previously saved records (on the mobile phone), without having to connect to the breaker.

As seen in FIG. 5, it illustrates a schematic of browsing through offline records 505 in accordance with an exemplary embodiment of the present invention. Click a "show" button 507 to view a record 510 or click a "share" button 512 to send the record 510 via email or messaging.

Figure 6:
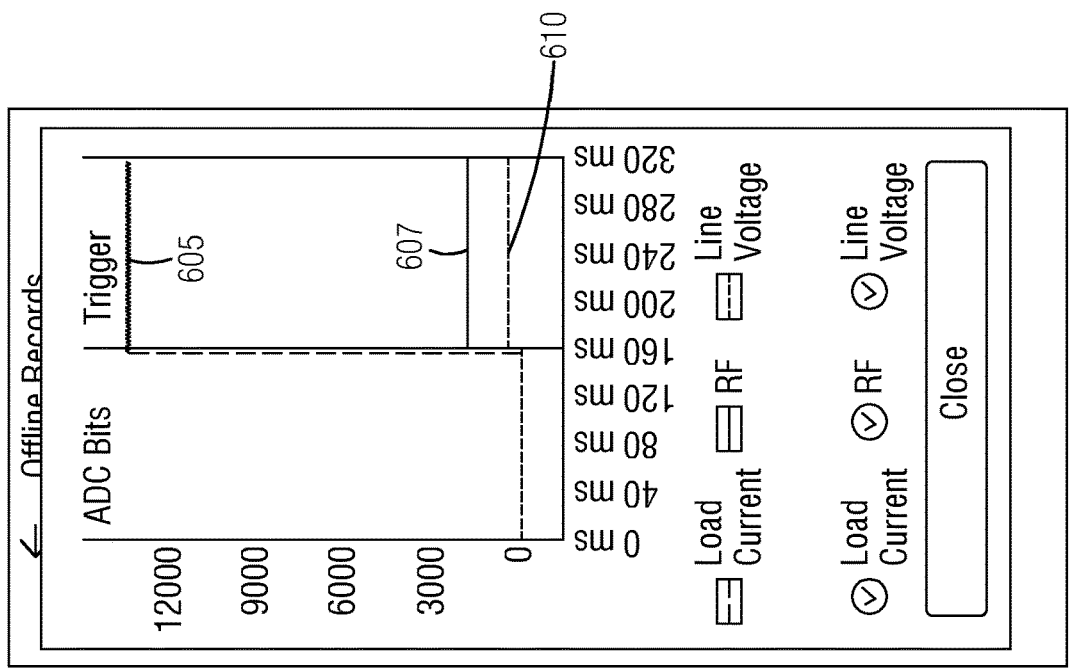
FIG. 6 illustrates a schematic of view after clicking show on the view history screen in accordance with an exemplary embodiment of the present invention.

As shown in FIG. 6, it illustrates a schematic of view after clicking show on the view history screen in accordance with an exemplary embodiment of the present invention. The display includes a graph for a load current 605, RF signal 607 and a line voltage 610. A trigger is also shown.

Figure 7:
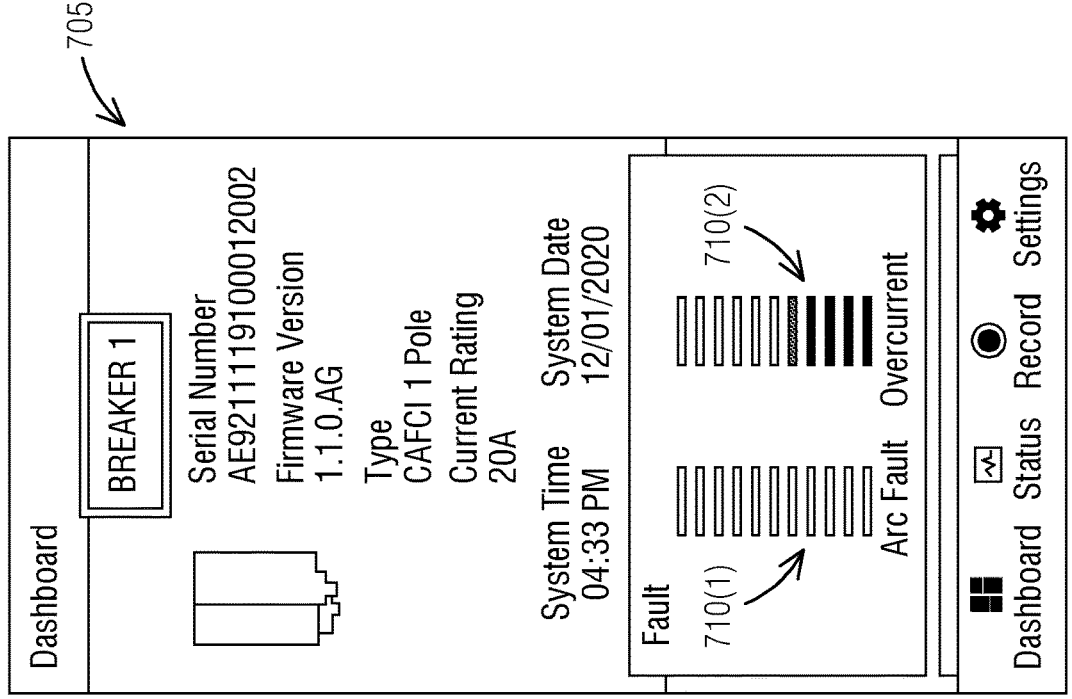
FIG. 7 illustrates a schematic of a dashboard screen in accordance with an exemplary embodiment of the present invention.

In FIG. 7, it illustrates a schematic of a dashboard screen in accordance with an exemplary embodiment of the present invention. The mobile App displays a dashboard page 705, upon a successful connection. The other pages like the status, record and settings page can be accessed by clicking on their respective icons on the bottom of the mobile App screen. The dashboard page 705 shows the Breaker Name (centered on the top), breaker rating, type, firmware revision and the date/time as set in the breaker device. Arc fault and overcurrent fault statuses are displayed in the form of LED bars 710(1-2) to represent how close the breaker is to trip on these faults. The breaker name and date/time fields can be edited from the settings page.

Figure 8:
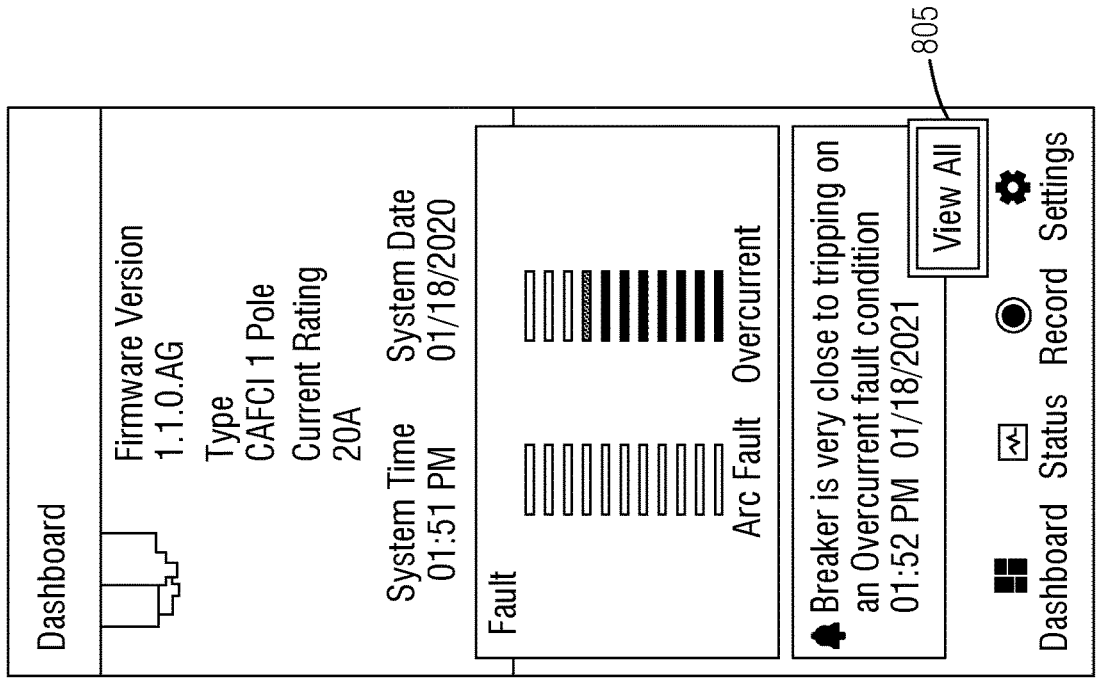
FIG. 8 illustrates a schematic of clicking "View All" to see a list of all alerts in accordance with an exemplary embodiment of the present invention.

With regard to FIG. 8, it illustrates a schematic of clicking "view all" soft button 805 to see a list of all alerts in accordance with an exemplary embodiment of the present invention. Alert notifications are displayed on this screen if any of the following conditions happen: i. if breaker is close to tripping on an arc fault, ii. if breaker is close to tripping on an overcurrent fault, iii. if the peak current or RMS current levels go beyond set threshold limits, iv. if breaker completed an oscilloscope capture and v. if phone lost connection with the breaker unexpectedly.

Figure 9:
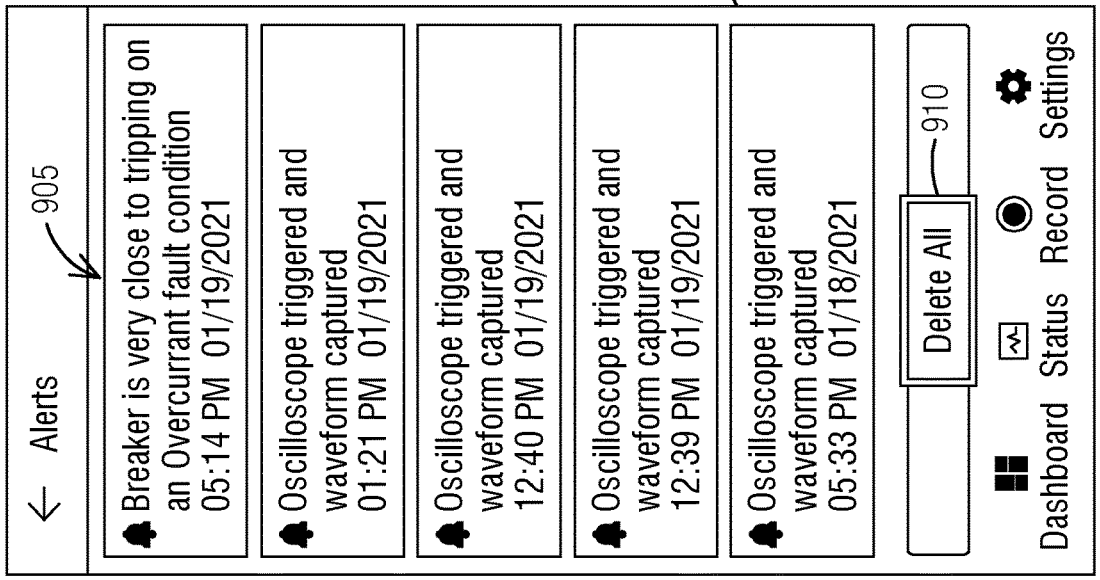
FIG. 9 illustrates a schematic of a list of all alerts in accordance with an exemplary embodiment of the present invention.

With respect to FIG. 9, it illustrates a schematic of a list 905 of all alerts in accordance with an exemplary embodiment of the present invention. A list of all the alerts and notifications (maximum of 50) along with a time stamp can be viewed by clicking on the view all soft button next to the alert on the dashboard page or breaker status screen. The individual alert message can be deleted from the list by swiping the finger across the alert. There is also an option to delete all alerts or notifications by pressing delete all soft button 910 that is at the bottom of a notifications screen 915.

Figure 10:
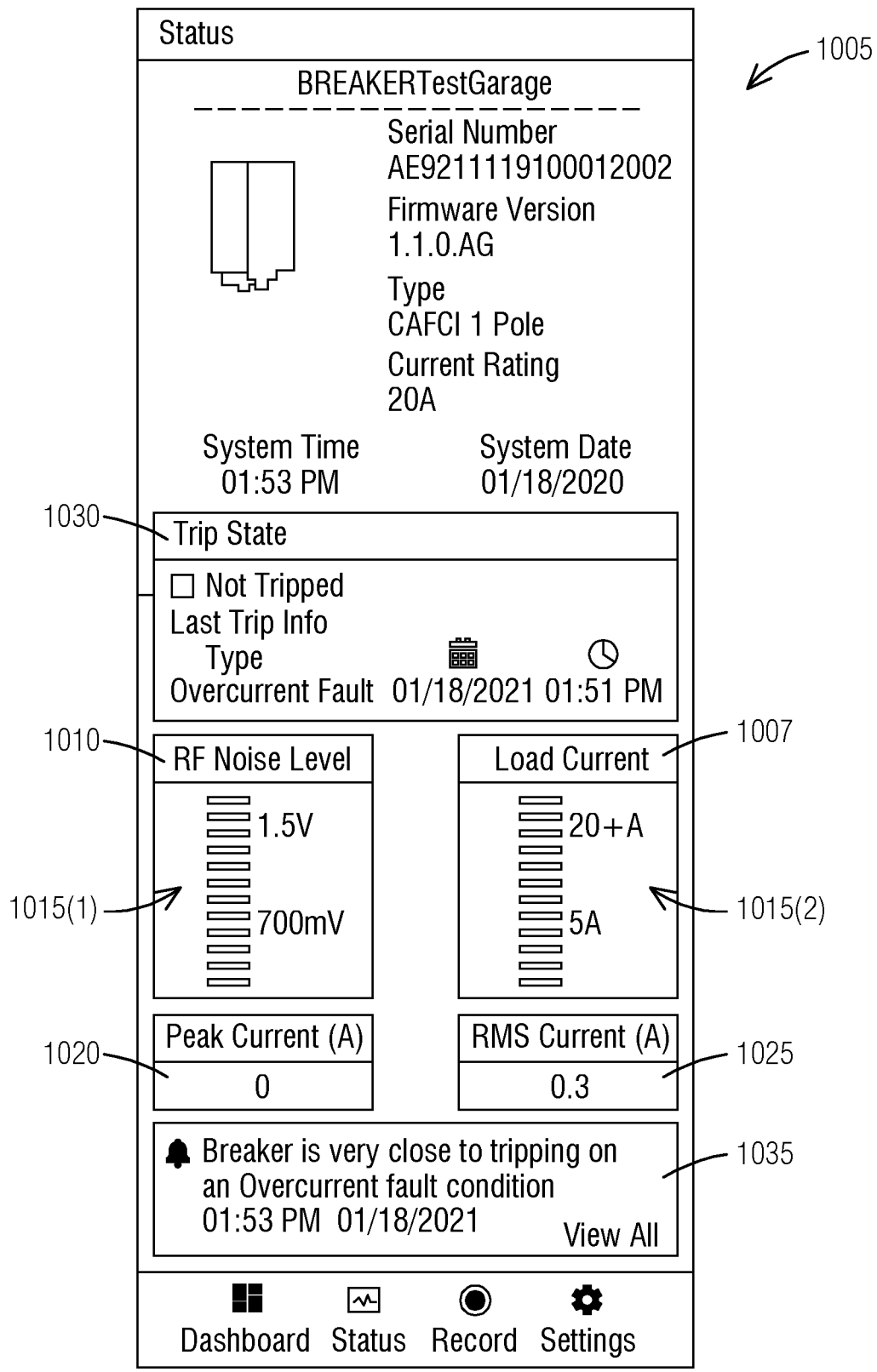
FIG. 10 illustrates a schematic of a status screen in accordance with an exemplary embodiment of the present invention.

FIG. 10 illustrates a schematic of a status screen 1005 in accordance with an exemplary embodiment of the present invention. The status screen 1005 shows more details of a circuit breaker like load current 1007 and RF signal data 1010 in the form of LED bars 1015(1-2). It also shows live peak 1020 and RMS 1025 current values. The status screen 1005 also has details of a trip state 1030 including the last time the breaker tripped, including the fault condition that led to the trip and the timestamp of that event. The alert/notification messages 1035 are also displayed on the status screen 1005.

Figure 11:
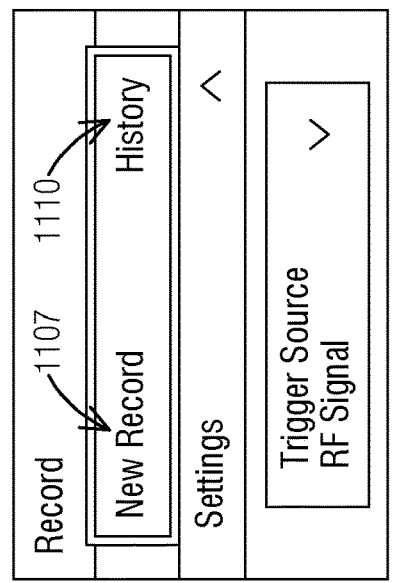
FIG. 11 illustrates a schematic of a record screen showing the 2 tabs in accordance with an exemplary embodiment of the present invention.

FIG. 11 illustrates a schematic of a record screen 1105 showing the 2 tabs in accordance with an exemplary embodiment of the present invention. The record screen 1105 has two tabs—new record 1107 and history 1110. The record screen 1105 provides an oscilloscope like interface to set up trigger conditions and to display the captured waveform while also giving the user the option to save all this data and view previously saved data. The new record 1107 tab lets the user configure a scope capture and view the associated data. This tab has two sections-settings and graph.

Figure 12:
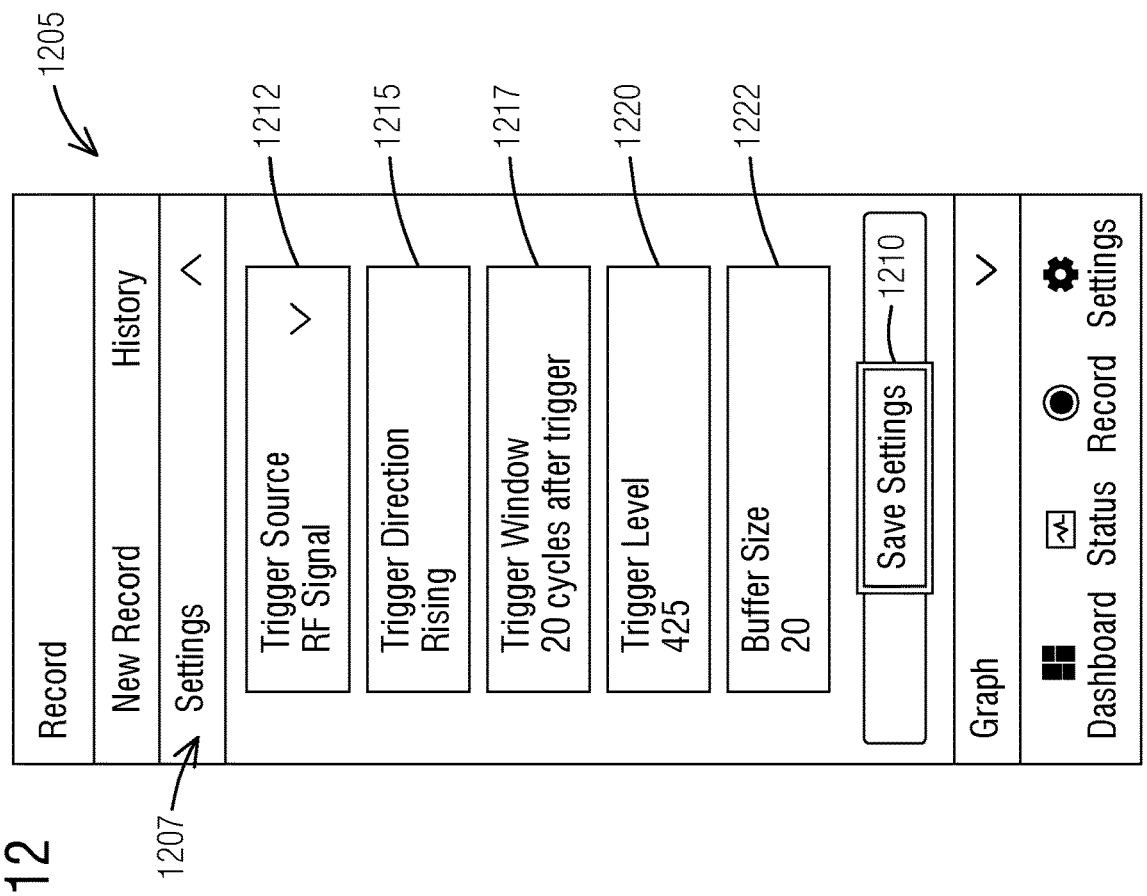
FIG. 12 illustrates a schematic of a new record screen with trigger settings option in accordance with an exemplary embodiment of the present invention.

FIG. 12 illustrates a schematic of a new record screen 1205 with trigger settings option in accordance with an exemplary embodiment of the present invention. Scope trigger settings 1207 are shown (expanded) by clicking on a down arrow to the right of settings (if it is not already expanded). After the trigger settings 1207 are selected, click on save settings 1210 to save these into the breaker's memory. The following are the list of parameters to set up a scope capture: Trigger Source 1212, Trigger Direction 1215, Trigger Window 1217, Trigger Level 1220 and Buffer Size 1222.

a) Trigger Source 1212

This determines the signal that would be used for the triggering the capture. The options for Trigger Source 1212 are:

i. RF Signal—Trigger when the RF signal crosses the threshold as set by the Trigger Level 1220 and Trigger Direction 1215. It uses the Trigger Direction 1215, Trigger Window 1217, and Trigger Level 1220 settings.

ii. Load Current ADC Signal—Trigger when the Load Current ADC signal crosses the threshold as set by the Trigger Level 1220 and Trigger Direction 1215. It uses the Trigger Direction 1215, Trigger Window 1217, and Trigger Level 1220 settings.

iii. ARC_TRIP— Trigger whenever the breaker trips on an Arc Fault.—Does not use the Trigger Direction 1215, Trigger Window 1217, and Trigger Level 1220 settings.

iv. ARC_ACCUMULATE— Trigger the next time the Arc Fault accumulator increments (i.e. possible arc detected). It only uses the Trigger Window 1217 settings.

v. MANUAL_TRIGGER— Trigger immediately with no intentional delay. It only uses the Trigger Window 1217 settings. Note: Set Trigger Window 1217 to 20 cycles after trigger for maximum waveform data.

b) Trigger Direction 1215 i. Rising—Trigger on the rising edge of the selected signal.

ii. Falling—Trigger on the falling edge of the selected signal.

c) Trigger Window 1217

The Trigger Window 1217 defines the length of data captured before and after the trigger event. Range: 20 cycles before trigger— 10 cycles before and 10 cycles after trigger— 20 cycles after trigger d) Trigger Level 1220

The Trigger Level 1220 is the value in ADC bits at which the oscilloscope function should trigger (dependent upon the Trigger Direction 1215).

e) Buffer Size 1222

The buffer size 1222 represents the size of the waveform captured in the breaker.

Figure 13:
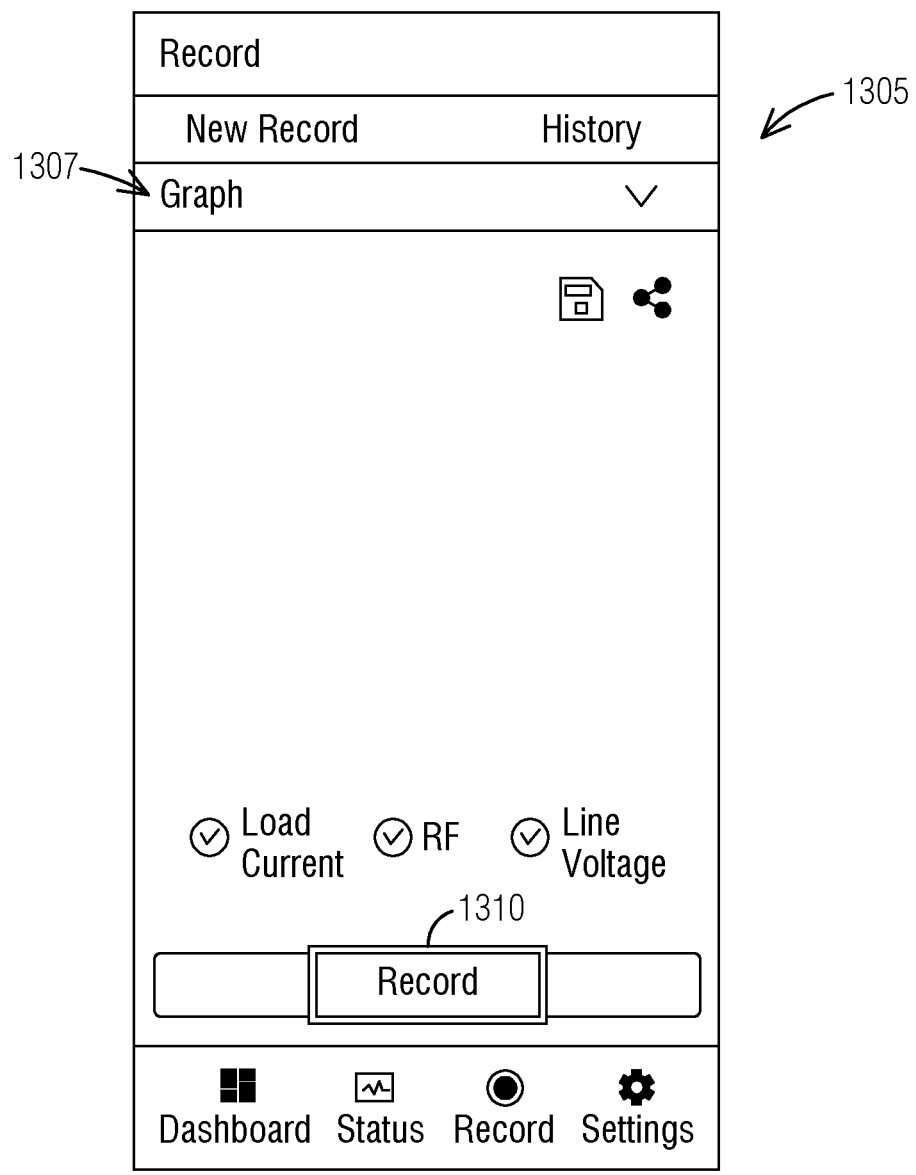
FIG. 13 illustrates a schematic of a record screen—how to set up a new capture in accordance with an exemplary embodiment of the present invention.

FIG. 13 illustrates a schematic of a record screen 1305— how to set up a new capture in accordance with an exemplary embodiment of the present invention. After adjusting the trigger settings 1207 in the settings section, expand a Graph section 1307 by clicking on the down arrow to the right. A scope trigger can be started by clicking on a Record button 1310. This brings up a pop-up window that says, "Waiting for capture". This is when the scope is waiting for the trigger condition to happen. If the user wants to cancel the waveform capture for some reason, they can press Cancel on a pop-up window (not shown) on the bottom of the record screen 1305. Once a trigger occurs, the waveform data will be downloaded. The download progress is indicated on the screen.

Figure 14:
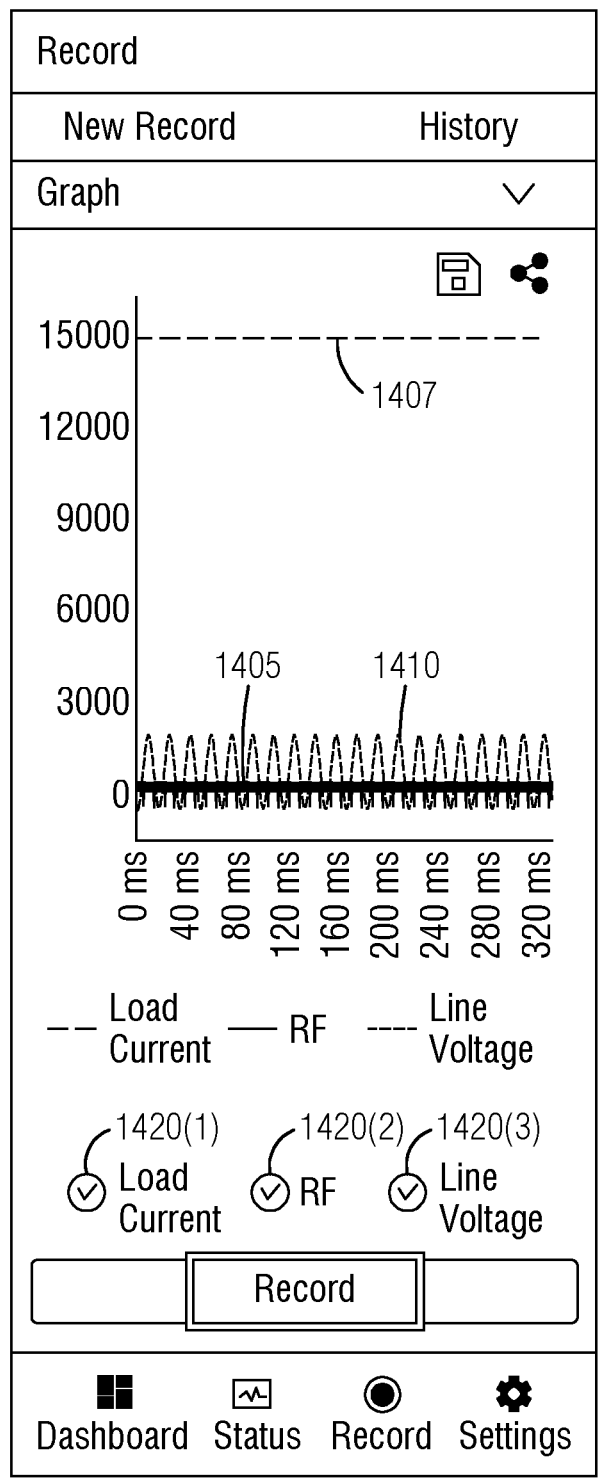
FIG. 14 illustrates a schematic of waveform data showing graph in accordance with an exemplary embodiment of the present invention.

FIG. 14 illustrates a schematic of waveform data showing graph in accordance with an exemplary embodiment of the present invention. The waveform data is displayed on the graph once the data has been downloaded. The waveform shows 3 signals that are plotted:

a) RF Signal 1405—The RF signal is the amount of RF noise found on the circuit which the AFCI is protecting.

b) Load Current Signal 1407— The load current signal is the current passing though the AFCI.

c) Line Voltage Signal 1410— The line voltage signal is the voltage between line and neutral on the AFCI.

The user can turn a signal on/off on graph 1415 by checking/unchecking the corresponding tick box 1420(1-3) below the graph 1415. The user can also zoom in and out of the graph by using finger pinching actions. The graph can be scrolled through using finger sliding action.

FIG. 15 illustrates a schematic of saving waveform data in accordance with an exemplary embodiment of the present invention. A user can save the waveforms along with the trigger settings associated with the capture by clicking on a save button on top of the graph. This brings up a textbox 1505 to enter a file name. The file name can accept alphabets, numbers, or characters like hyphen(-), underscore(_) and hash(#). Once the file name is entered, click save 1507 to store the waveform file in the mobile App. The waveforms can be shared outside the mobile phone by clicking on a share button on top of the graph. This brings up the messaging or email Apps that can be used to message or email the waveform data.

FIG. 16 illustrates a schematic of viewing list of saved records in accordance with an exemplary embodiment of the present invention. A history tab 1605 shows all the waveforms that were captured on the circuit breaker (using the mobile phone) and saved to the mobile phone. It displays a list 1607 of all the waveform records by the file name and time stamp. A delete all button 1610 at the bottom of the list, deletes all the records related to the circuit breaker that were stored on the mobile phone. The user can view a record in detail by clicking on a down arrow button 1615 next to a filename 1620.

Figure 17:
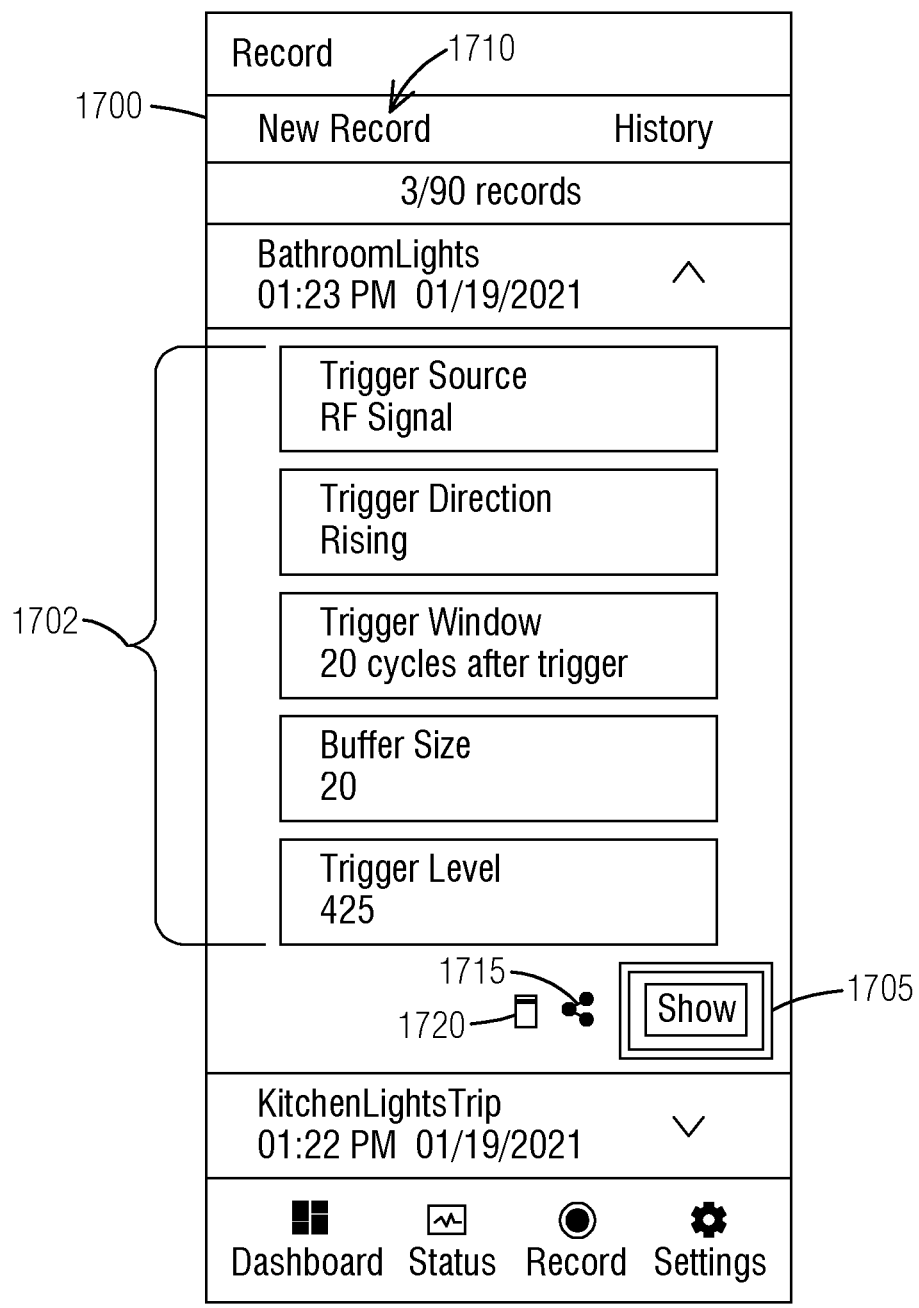
FIG. 17 illustrates a schematic of viewing details from a saved record in accordance with an exemplary embodiment of the present invention.

FIG. 17 illustrates a schematic of viewing details from a saved record 1700 in accordance with an exemplary embodiment of the present invention. The record 1700 details include all trigger settings 1702 that were used for the capture. The user can press a show button 1705 to view the graph which provides a very similar user interface like the graph section of a new record tab 1710. The user can also share the waveform record via email or message from this screen by pressing a share button 1715 next to the show button 1705. In addition, the user can also delete a record from the phone by clicking a delete button 1720 next to the share button 1715.

The mobile App has a settings page where the user can view and update the mobile App and breaker settings. The following settings can be updated: Breaker Time and Date, Breaker Name, Breaker Firmware (Application Coprocessor and Wireless Coprocessor), Variables, Notification Settings and Demo Mode.

A screen allows the user to set the Time and Date of the breaker. This setting will be active in the breaker until it loses power. By default, the time and date on this screen will match the time that is set on the user's mobile phone. A screen allows the user to set the Breaker Name. It allows up to 25 alpha numeric characters. This setting will be permanently saved in the breaker when "Save Changes" is clicked.

Figure 18:
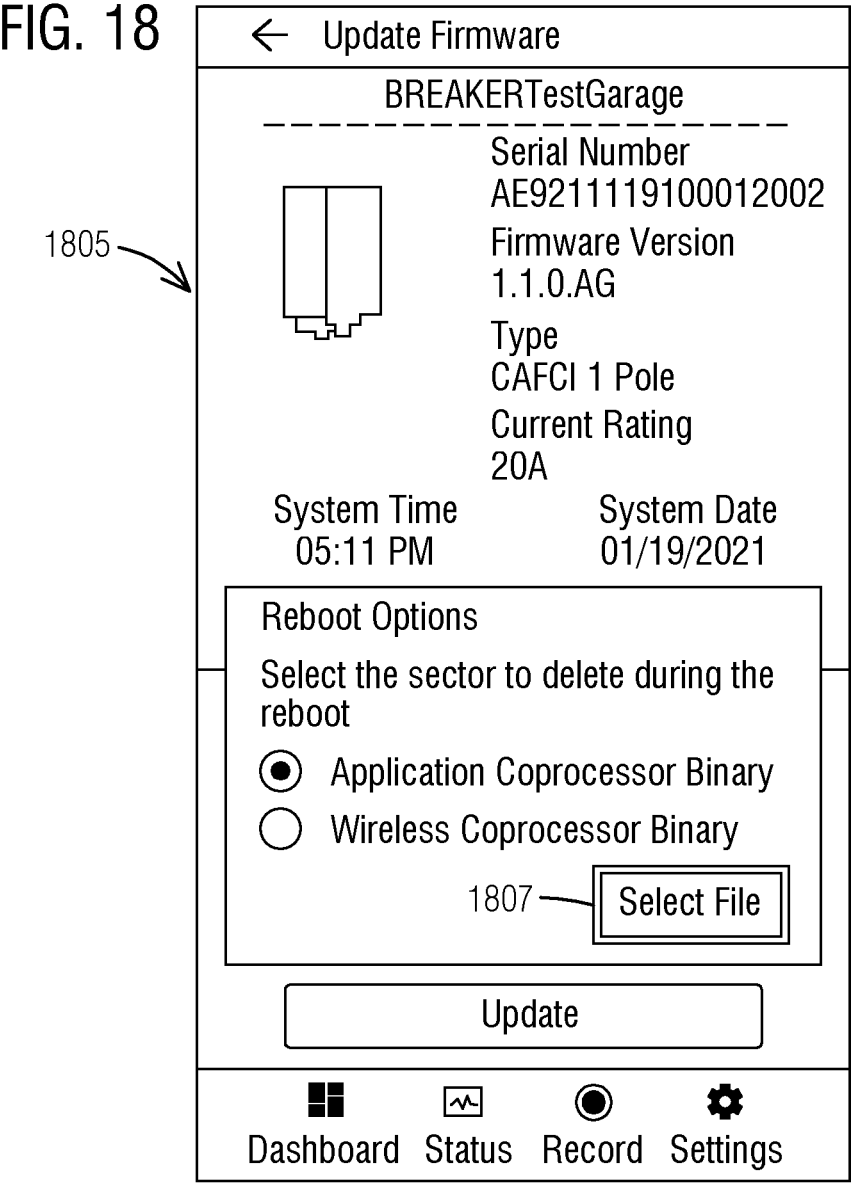
FIG. 18 illustrates a schematic of starting firmware upgrade in accordance with an exemplary embodiment of the present invention.

FIG. 18 illustrates a schematic of starting firmware upgrade in accordance with an exemplary embodiment of the present invention. This screen 1805 allows the user to do a wireless firmware update to the circuit breaker 105. Updating the firmware include the following steps.

i. Click a Select File button 1807.

ii. Select the desired file from the mobile phone.

iii. Ensure that Application Coprocessor Binary is selected and click Update. The update takes a few minutes to complete.

iv. Once the firmware update is completed successfully, a pop-up window will indicate the status. After user clicks on Ok, the circuit breaker will undergo a reset and the mobile App will bring up the Available Devices screen. At this point, the user has to select the breaker device to connect to from the list to be navigated to the Dashboard page of the breaker.

Figures 19, 20:
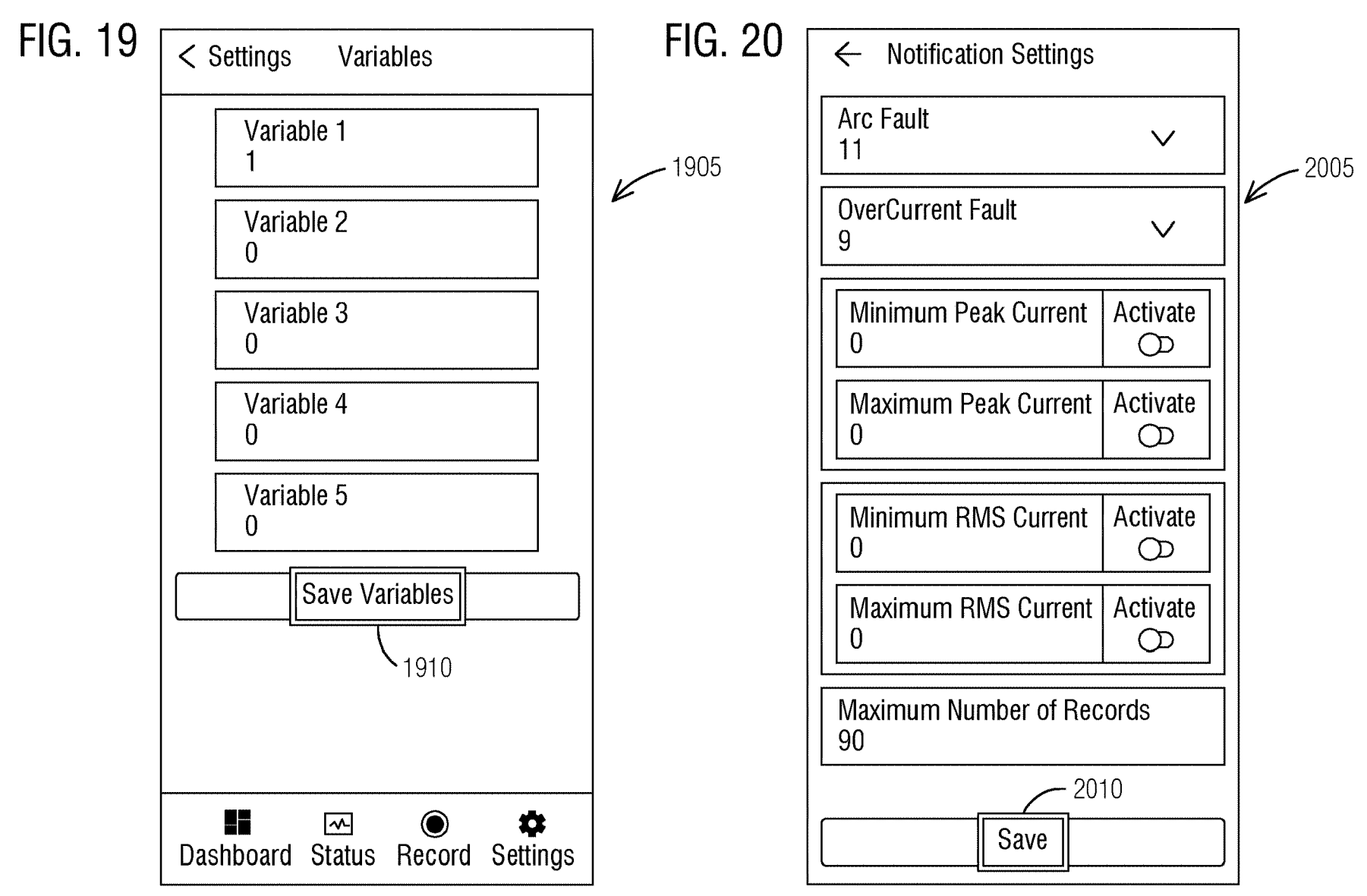

FIG. 19 illustrates a schematic of editing variables in accordance with an exemplary embodiment of the present invention. A variables screen 1905 has five variables that are stored to Flash. After making changes to the variables, click a Save Variables button 1910 to permanently save these parameters to the circuit breaker 105.

FIG. 20 illustrates a schematic of editing threshold settings for alerts in accordance with an exemplary embodiment of the present invention. This screen 2005 allows the user to set thresholds for Faults and Current. The threshold values for the following alerts can be set here: Arc Fault (Range of 0-12), Overcurrent Fault (Range of 0-12), Minimum/Maximum Peak Current Minimum/Maximum RMS Current and Maximum number of waveform records that can be saved per breaker. In addition, Peak current and RMS current related alerts can be enabled or disabled by using the Activate switch. After adjusting the threshold values here, the user needs to press a save button 2010 for the settings to be stored in the mobile App database for each breaker device.

When the parameters go beyond the threshold values listed here, alerts would be generated on the Dashboard and Status page. In addition, if the waveform records have reached the maximum capacity as set by the threshold here, the related alert would be displayed when the user attempts to start a new scope capture on the Record screen. In that scenario, the user would have to delete at least one record before starting the new capture.

Demo Mode option allows the user that is connected to a breaker device to get sample data on the Dashboard and Status pages. This option is primarily used by developers and is for demonstration purpose only.

Figure 21:
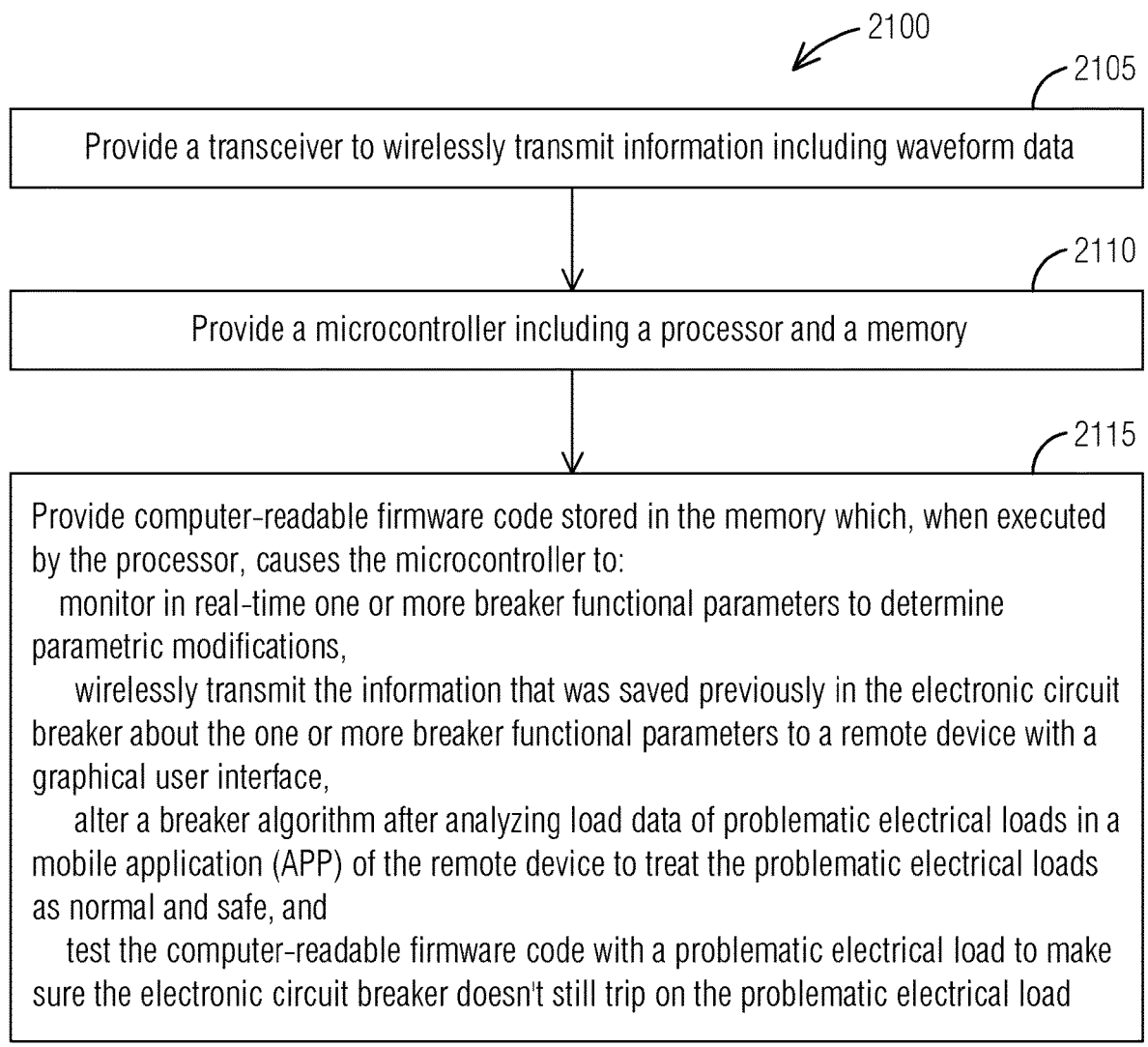
FIG. 21 illustrates a schematic view of a flow chart of a method of retrieving waveform data from an electronic circuit breaker wirelessly and altering a breaker code wirelessly in accordance with an exemplary embodiment of the present invention.

FIG. 21 illustrates a schematic view of a flow chart of a method 2100 of retrieving waveform data from an electronic circuit breaker wirelessly and altering a breaker code wirelessly in accordance with an exemplary embodiment of the present invention. Reference is made to the elements and features described in FIGS. 1-20. It should be appreciated that some steps are not required to be performed in any particular order, and that some steps are optional.

The method 2100 comprises a step 2105 of providing a transceiver to wirelessly transmit information including waveform data. The method 2100 further comprises a step 2110 of providing a microcontroller including a processor and a memory. The method 2100 further comprises a step 2115 of providing computer-readable firmware code stored in the memory which, when executed by the processor, causes the microcontroller to: monitor in real-time one or more breaker functional parameters to determine parametric modifications, wirelessly transmit the information that was saved previously in the electronic circuit breaker about the one or more breaker functional parameters to a remote device with a graphical user interface, alter a breaker algorithm after analyzing load data of problematic electrical loads in a mobile application (APP) of the remote device to treat the problematic electrical loads as normal and safe and test the computer-readable firmware code with a problematic electrical load to make sure the electronic circuit breaker doesn't still trip on the problematic electrical load.

While an electronic circuit breaker for a residential application is described here a range of one or more other breakers or other forms of breakers are also contemplated by the present invention. For example, other types of breakers may be implemented based on one or more features presented above without deviating from the spirit of the present invention.

The techniques described herein can be particularly useful for AFCI diagnostics via a mobile App. While particular embodiments are described in terms of these AFCI diagnostics, the techniques described herein are not limited to such a set-up but can also be used with other diagnostics.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
an electronic circuit breaker;
a remote device with a graphical user interface with an accompanying mobile application (APP),
the electronic circuit breaker comprising:
a transceiver to wirelessly transmit and receive information;
a microcontroller including a processor and a memory; and
computer-readable firmware code including a selectable breaker algorithm stored in the memory which, when executed by the processor, causes the microcontroller to:
monitor in real-time one or more breaker functional parameters to determine parametric modifications,
wirelessly transmit the information saved previously in the electronic circuit breaker about the one or more breaker functional parameters to the remote device with the graphical user interface,
alter the one or more breaker functional parameters of the selectable breaker algorithm using the electronic circuit breaker in combination with the mobile application (APP) after analyzing load data of problematic electrical loads in the mobile application (APP) of the remote device to treat the problematic electrical loads as normal and safe, and
wherein the graphical user interface of the remote device includes scope trigger settings including a Trigger Source as parameters to set up a scope capture, and
wherein the Trigger Source determines a signal that is used for triggering the scope capture; and
wherein the Trigger Source includes: an RF signal being a trigger when the RF signal is above a threshold set by a Trigger Level, and wherein the RF signal is an amount of RF noise found on a circuit which the electronic circuit breaker is protecting.

2. The electronic circuit breaker of claim 1, wherein the computer-readable firmware code lets the mobile application (APP) wirelessly retrieve information from the electronic circuit breaker installed in a panel.

3. The electronic circuit breaker of claim 1, wherein the mobile application (APP) is configured to show waveforms including live current, voltage and Radio Frequency (RF) signal data which are used in the breaker algorithm to trip in case of an unsafe and arcing electrical load.

4. The electronic circuit breaker of claim 1, wherein the mobile application (APP) is configured to work in tandem with the electronic circuit breaker so the mobile application (APP) can act like an oscilloscope where a user can set certain trigger conditions and the mobile application (APP) will show captured results.

5. The electronic circuit breaker of claim 1, wherein the mobile application (APP) is configured to share any retrieved data by means of email or messaging Apps outside of a phone on which the mobile application (APP) is installed.

6. The electronic circuit breaker of claim 1, wherein transmitted waveform data can be viewed in a graphical format in the mobile application (APP) for user analysis of the problematic electrical loads.

7. The electronic circuit breaker of claim 1, wherein the mobile application (APP) enables a user to modify the one or more of breaker functional parameters to alter a selected breaker algorithm.

8. The electronic circuit breaker of claim 1, wherein if there is a firmware code update that is necessary to fix an issue a new firmware code can be programmed into the electronic circuit breaker wirelessly through the mobile application (APP).

9. The electronic circuit breaker of claim 8, wherein the electronic circuit breaker can then be tested with the problematic electrical load to ensure the new code has helped fix an unwanted tripping problem.

10. The electronic circuit breaker of claim 1, wherein the firmware code is configured to store previous trip events with a time stamp.

11. A method of retrieving waveform data from an electronic circuit breaker wirelessly and altering a breaker code wirelessly via a remote device with a graphical user interface with an accompanying mobile application (APP), the method comprising:

providing a transceiver to wirelessly transmit and receive information;

providing a microcontroller including a processor and a memory; and providing computer-readable firmware code including a selectable breaker algorithm stored in the memory which, when executed by the processor, causes the microcontroller to:

monitor in real-time one or more breaker functional parameters to determine parametric modifications, wirelessly transmit the information saved previously in the electronic circuit breaker about the one or more breaker functional parameters to the remote device with the graphical user interface, alter the one or more breaker functional parameters of the selectable breaker algorithm using the electronic circuit breaker in combination with the mobile application (APP) after analyzing load data of problematic electrical loads in the mobile application (APP) of the remote device to treat the problematic electrical loads as normal and safe, wherein the graphical user interface of the remote device includes scope trigger settings including a Trigger Source as parameters to set up a scope capture, and wherein the Trigger Source determines a signal that is used for triggering the scope capture; and wherein the Trigger Source includes: an RF signal being a trigger when the RF signal value is above a threshold set by a Trigger Level, and wherein the RF signal is an amount of RF noise found on a circuit which the electronic circuit breaker is protecting.

12. The method of claim 11, wherein the computer-readable firmware code lets the mobile application (APP) wirelessly retrieve information from the electronic circuit breaker installed in a panel.

13. The method of claim 11, wherein the mobile application (APP) is configured to show waveforms including live current, voltage and Radio Frequency (RF) signal data which are used in the breaker algorithm to trip in case of an unsafe and arcing electrical load.

14. The method of claim 11, wherein the mobile application (APP) is configured to work in tandem with the electronic circuit breaker so the mobile application (APP) can act like an oscilloscope where a user can set certain trigger conditions and the mobile application (APP) will show captured results.

15. The method of claim 11, wherein the mobile application (APP) is configured to share any retrieved data by means of email or messaging Apps outside of a phone on which the mobile application (APP) is installed.

16. The method of claim 11, wherein transmitted waveform data can be viewed in a graphical format in the mobile application (APP) for user analysis of the problematic electrical loads.

17. The method of claim 11, wherein the mobile application (APP) enables a user to modify the one or more of breaker functional parameters to alter a selected breaker algorithm.

18. The method of claim 11, wherein if there is a firmware code update that is necessary to fix an issue a new firmware code can be programmed into the electronic circuit breaker wirelessly through the mobile application (APP).

19. The method of claim 18, wherein the electronic circuit breaker can then be tested with the problematic electrical load to ensure the new code has helped fix an unwanted tripping problem.

20. The method of claim 11, wherein the firmware code is configured to store previous trip events with a time stamp.

* * * * *